UNITED STATES PATENT OFFICE.

JOHN J. FANNING, OF CHICAGO, ILLINOIS, ASSIGNOR OF ONE-HALF TO JOHN BAIRSTOW, OF SAME PLACE.

INSULATING COMPOUND.

SPECIFICATION forming part of Letters Patent No. 507,678, dated October 31, 1893.

Application filed May 27, 1893. Serial No. 475,679. (No specimens.)

*To all whom it may concern:*

Be it known that I, JOHN J. FANNING, a citizen of the United States, residing at Chicago, in the county of Cook and State of Illinois, have invented a certain new and useful Improvement in Insulating Compounds, of which the following is a full, clear, concise, and exact description, reference being had to the accompanying drawings, forming a part of this specification.

My invention relates to a composition of matter to be used for covering rheostats and other electrical devices for purposes of insulation, and consists of the following ingredients combined in about the proportions stated: six ounces plaster of paris, five ounces pulverized asbestus, four ounces dextrine, one ounce linseed or other oil.

The powdered matter, consisting of plaster of paris, pulverized asbestus and dextrine, is preferably thoroughly mingled by agitation, after which linseed or other oil is poured in and the whole thoroughly mixed by agitation with hot water sufficient to bring the material to a plastic state, when it can be applied readily to the purposes for which it is intended. After the rheostat or other electrical device to which this material is to be applied has been covered and the material has become dry, I preferably add, to protect the material, a coat of shellac.

By the use of the above composition electrical devices may be thoroughly protected, and at the same time insulated. The composition of matter has the property of being fire-proof, and, when dry, although brittle, it is not liable to crank under the influence of heat.

I have found this composition of matter to be useful in its application to resistance coils for use in theater stage lighting, and other purposes where heat is peculiarly liable to be developed by the passage of current through the coils.

While I use boiling water to assist in the mixing of the material, it may be dispensed with, and I do not wish to have it considered as an essential ingredient of my invention.

Many other applications of this composition of matter will be obvious. I do not, therefore, wish to limit myself to the application mentioned, nor to the precise proportion of the ingredients set forth, as a slight variation thereof may be made and still secure the important objects which are accomplished by my invention.

What I claim as new, and desire to secure by Letters Patent, is—

The herein described composition of matter, consisting of plaster of paris, asbestus, dextrine and linseed oil, in substantially the proportions specified.

In witness whereof I hereunto subscribe my name this 16th day of May, A. D. 1893.

JOHN J. FANNING.

Witnesses:
   CHARLES A. BROWN,
   GEORGE L. CRAGG.